Figure 5:
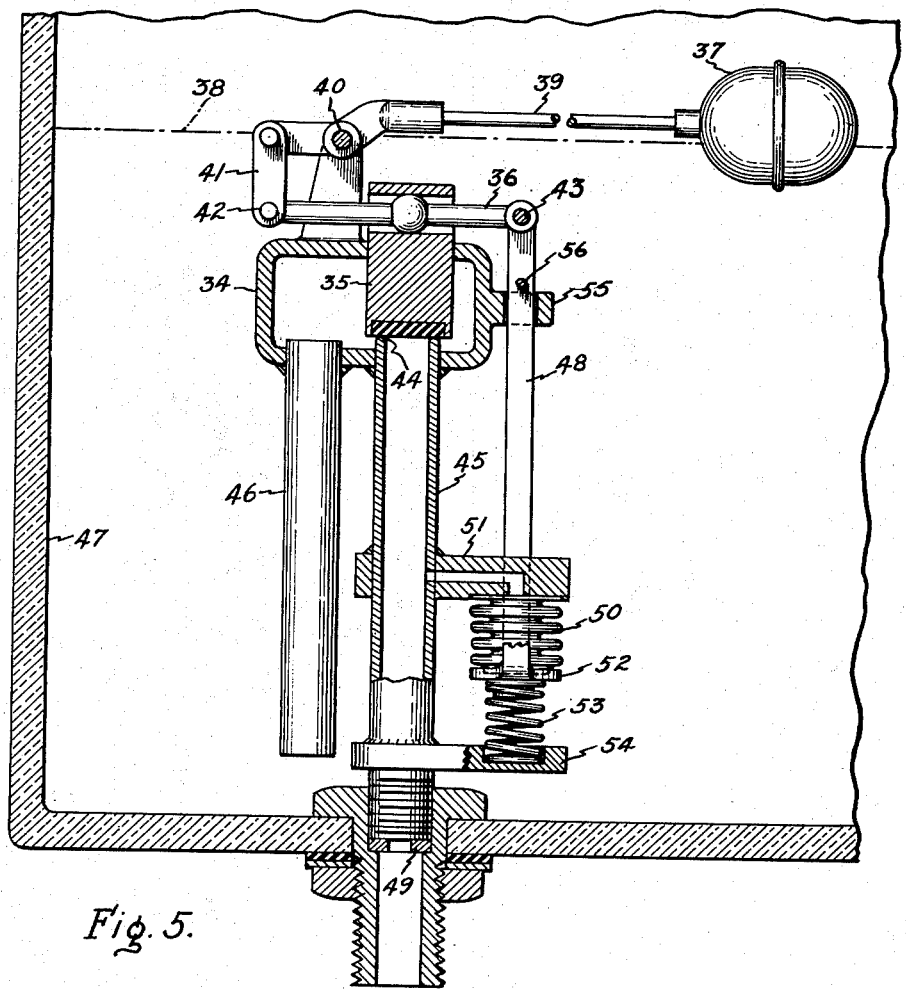

Aug. 31, 1954     A. W. SEAR     2,687,744
FAST ACTING VALVE
Filed Sept. 2, 1949     2 Sheets-Sheet 1
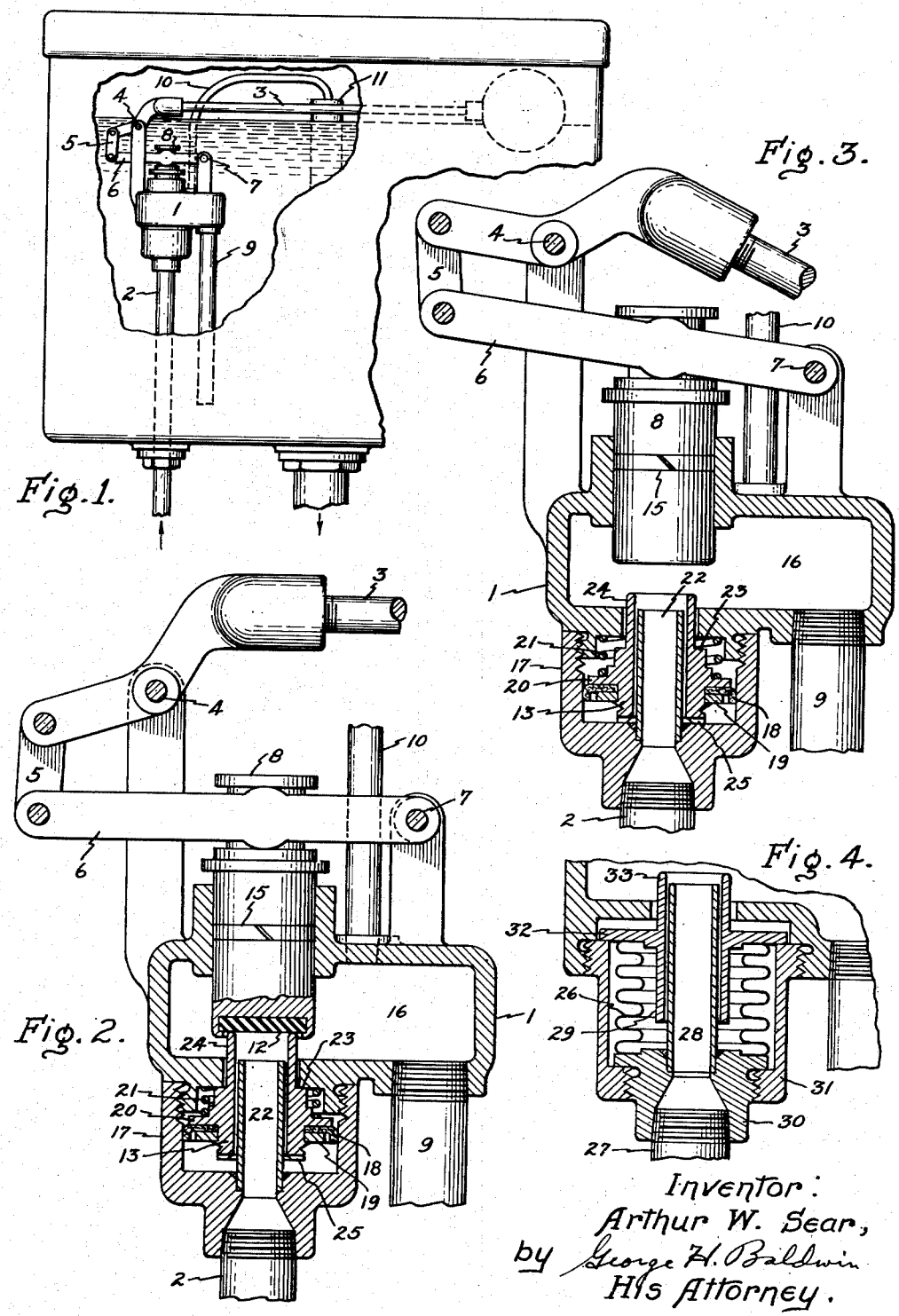
Inventor:
Arthur W. Sear,
by George H. Baldwin
His Attorney.

Inventor:
Arthur W. Sear,
by George H. Baldwin
His Attorney.

Patented Aug. 31, 1954

2,687,744

UNITED STATES PATENT OFFICE 2,687,744

FAST ACTING VALVE

Arthur W. Sear, Syracuse, N. Y.

Application September 2, 1949, Serial No. 113,718

15 Claims. (Cl. 137—416)

My invention relates to fast acting valves, and more particularly to a valve characterised by a movable seat portion and a movable valve portion. My invention is particularly applicable to ball cock valves.

A general object of my invention is to improve the operation of valves adapted to control liquid flow in response to motion of a controlling member.

A more specific object is to provide more rapid and positive action of a liquid controlling valve as the valve is being opened or as the valve is being closed.

The novel features which I believe to be characteristic of my invention are set forth with particularity in the appended claims. My invention, itself, however, both as to its organization and method of operation, together with further objects and advantages thereof may best be understood by reference to the following description taken in connection with the accompanying drawing in which Fig. 1 is a view of a valve in accord with one aspect of my invention shown in operative position in a toilet flush tank, the tank being partially cut away; Fig. 2 is a partially sectional side view of a valve according to my invention in closed position; Fig. 3 is a similar view of the valve of Fig. 2 in open position; Fig. 4 is a partially sectional view of a portion of a modified valve embodying my invention; and Fig. 5 is a partially sectional view of a valve embodying a further modification in accord with my invention.

While valves in accord with my invention are particularly adapted for use as ball cock valves in toilet flush tanks and while the valves specifically described herein are of this type, it will be understood that valves embodying the invention are useful in many other applications.

Turning now to Fig. 1, which shows a valve according to my invention in operative association with other devices in a toilet flush tank, the valve body 1 is mounted on the upper end of a water supply or inlet pipe 2 and is provided with a float ball, shown in dotted lines, to operate the valve through a float arm 3 pivoted on horizontal pivot pin 4. A lever system comprising a link 5 and lever arm 6 is connected to the float arm in a known manner so as to cause arm 6 to pivot upwardly about stationary horizontal pivot pin 7 as the float ball, floating in the water, drops in the tank as the water is flushed therefrom, and to pivot downwardly toward the full tank position shown in this figure as the tank fills again. This motion of arm 6 is transmitted by an enlarged approximately central portion of the arm to an engaged vertically movable valve plunger member 8. This type of coupling between the lever arm and valve member freely permits pivoting of the arm at the central portion on the valve member. Valve member 8 is generally cylindrical in shape and has a portion of reduced cross section near the upper end in the form of a peripheral groove in which the enlarged portion of the actuating arm 6 is disposed as best seen in Figs. 2 and 3. The arm 6 preferably comprises two portions arranged on opposite sides of member 8, and it will be recognized that this construction is known, as are other suitable forms of linkage arrangements.

The valve shown in Fig. 1 is adapted, in response to upward motion of lever arm 6 and valve member 8, to admit water from inlet pipe 2 into the valve body 1 from which the water enters the tank through a pipe 9 extending downwardly toward the bottom of the tank. In addition, a smaller after flow pipe or tube 10 is provided extending upwardly from the valve body and terminating in the open pipe 11 which communicates with the toilet bowl.

Conventional pipe fittings are provided to the tank as indicated at the bottom of the tank in Fig. 1.

The detail sectional views of the valve in Figs. 2 and 3 are numbered to correspond to the above description of Fig. 1, and Figs. 2 and 3 show the body 1, inlet pipe 2, float arm 3, float arm pivot pin 4, link 5, actuating lever arm 6 pivotally mounted by pivot pin 7, movable valve member 8, fill pipe 9, and after flow pipe 10.

In Fig. 2, valve member 8 is shown in the lower or closed position which exists when the flush tank is full. In this position, a washer 12 of hard rubber, leather, or other suitable material forming the lower surface of the valve member abuts and is seated against the uppermost or seat portion of the hollow cylindrical valve seat member 13, which is thus in contact with an annular area of the washer. The washer 12 may be held in place as shown by a crimped-over peripheral portion of valve member 8, or it may be held by a bolt threaded upwardly into the body of member 8 through the center of the washer, or in any other desired manner.

Valve member 8 is disposed in a cylindrical bore provided through an enlarged upper portion 14 of body 1 and is provided with a packing washer 15 to assist in lubrication and to prevent leakage of the water or other liquid from the chamber 16 of the valve body 1 when the valve is open. Valve member 8 slides longitudinally or axially within the bore in response to pivotal motion of actuating arm 6 about pivot pin 7.

Valve seat member 13 comprises, at its lower portion, a piston member slidably arranged in a cylinder 17. A flexible, cup shaped washer 18 is peripherally arranged about the member and comprises a portion of the piston, forming a slidable watertight seal with the cylinder wall against the internal pressure of water from inlet pipe 2, and the washer is held in place on the piston member between a ring 19 and a shoulder 20 of the member 13. Ring 19 may be held against washer 18 by small ears or burrs chiseled out of the piston body. Cylinder 17 is screw threaded to a boss extending outwardly from the valve body 1, and a compression spring 21 is arranged between body 1 and shoulder 20 tending to force valve seat member 13 downwardly away from valve member 8. The force thus applied by the spring is counteracted by water pressure against the underside of the piston, including the underside of ring 19 and washer 18 which form a part thereof. The piston thus comprises a movable pressure-responsive element biased into a downward position by the spring and movable upwardly by an increase in water pressure against the under surface. The piston is mechanically connected to move the valve seat upwardly toward valve member 8 in response to an increase in pressure, and downwardly, away from valve member 8 in response to a decrease in pressure.

Extending upwardly from the lower end wall of the cylinder 17 is a pipe or tube 22 functioning as a nozzle communicating with the inlet pipe 2. Pipe 22 may be soldered, as shown, or threaded into the lower portion of the cylinder. The outer diameter of pipe 22 is less than the inner diameter of the cylindrical bore of the valve seat member, and provides a clearance of the order of one-tenth millimeter between the wall defining the bore and the outside surface of pipe 22. The clearance should be small to limit the rate of closing of the valve and thus avoid water-hammer effects. Water-hammer may also be eliminated by providing an air cushion in a closed branch pipe leading upwardly from inlet pipe 2. Accordingly, when the valve is in the closed position, shown in Fig. 2, water is forced into the cylinder space under the piston to drive the valve seat member 13 into its uppermost position as limited by shoulder 23 formed thereon, the shoulder functioning as a stop against valve body 1. A greater clearance, requiring not so close manufacturing tolerances, between the bore of the valve seat member and the outer surface of pipe 22 may be permitted if peripheral grooves are cut in the outer pipe surface to form a type of labyrinth and increase the resistance to flow through the space about the pipe.

Neck portion 24 of the valve seat member extends through a circular opening in the valve body 1, and the outer neck diameter is in the order of a millimeter, or less, smaller than the inner diameter of the opening in the body 1 to provide a channel, during certain parts of the valve operating cycle, communicating between the upper portion of the cylinder and the interior chamber 16 of valve body 1.

In order that the channel between the outer wall of pipe 22 and the wall of the central bore of valve seat member 13 may not be sealed off when the member 13 is at its lower limit of travel, grooves may be provided, as shown, in the lower face 25 of the piston portion of seat member 13, the grooves extending radially outwardly from the internal bore of the seat member and communicating with the space within the cylinder 17 beneath the piston member. The purpose of these grooves will become apparent from a consideration of Fig. 3.

Fig. 3 shows the valve member 8 in raised position and the valve open in response to dropping of float arm 3. Water from pipe 2 may, under these conditions, enter the chamber 16 in valve body 1 and flow through fill pipe 9 to fill the tank and through after flow pipe 10 as heretofore described.

Valve seat body 13 is forced downwardly by the biasing force of compression spring 21 when the valve is open, as shown in Fig. 3, since the water pressure under the piston within the lower portion of cylinder 17 is released and the water in this lower portion of the cylinder is free to flow along the passage between the outer wall of pipe 22 and the wall of the cylindrical bore through valve seat member 13 into chamber 16. The grooves in the lower face of the piston portion of member 13, as described in connection with Fig. 2, assist in releasing the pressure under the piston as the member 13 approaches the lower limit of travel. The flow through these channels and passages is also assisted by the jet action of the water flowing rapidly through pipe 22 which tends to draw water upwardly along the wall of the bore of member 13. While compression spring 21 is preferably provided as shown, it has been found that the weight of member 13 alone is sufficient to operate the valve as described. The jet action also assists in providing a downward bias for member 13 since this action tends to draw water from the space below the piston, and the jet action alone, under these circumstances may be enough to cause the necessary motion unaided by a spring or by the weight of the movable members.

As the valve seat body 13 moves downwardly, under the force of spring 21 and the jet action, water flows into the upper portion of the cylinder above the piston through the channel heretofore described communicating between chamber 16 and the upper portion of the cylinder.

In operation, the valve rapidly and positively opens in response to dropping of float arm 3, and also rapidly and positively closes as arm 3 reaches a predetermined upper position. Thereafter the valve remains closed until arm 3 drops substantially below this predetermined position.

More particularly, assuming that the arm 3 is caused to drop as the tank is drained, thereby to open the valve by moving valve member 8 in an upward direction from the position shown in Fig. 2, water will flow into chamber 16 and this flow, together with the force of spring 21, tends to drive the water from the lower portion of the cylinder. Seat member 13, accordingly, moves downwardly to its limit of travel as shown in Fig. 3. While this action takes place, through jet action the water in the lower part of the cylinder is drawn out with the water flow through the nozzle portion 22. At the same time, water is drawn from the valve chamber 16 into the upper portion of the cylinder above the piston. Since seat member 13 and valve member 8 have thus both been displaced by movements in respectively opposite directions, the valve is opened more widely than would have occurred had valve seat member 13 remained stationary.

As the tank fills, from the liquid flow through fill pipe 9, float arm 3 slowly rises causing valve member 8 to approach the valve seat, but throughout most of the time the tank is filling, the valve continues to pass water rapidly. Finally the valve member 8 is moved close to the seat to cause the water pressure within the bore of member 13 to increase sufficiently to force water down along the outside of pipe 22 into the lower portion of the cylinder, and as the pressure under the piston becomes sufficiently great to overcome the force of spring 21, valve seat member 13 starts to move upwardly. This further increases the pressure in the bore of member 13, and accordingly further increases the pressure under the piston. The speed of upward motion of the member 13 is purposely limited, however, to prevent water hammer, by the water trapped in the upper portion of the cylinder above the piston. The water in the upper portion of the cylinder escapes slowly around neck portion 24 through the opening in body 1 into chamber 16. It may take, for example, the greater part of a second, or longer, for the member 13 to rise sufficiently to cause contact between the washer 12 and the valve seat. Such contact is made, preferably, before member 13 has reached its upper limit of travel, and its continued travel, just after the flow of water through the valve is stopped, serves to push upwardly against the contacted annular area of the bottom surface of valve member 8 and thereby to cause float arm 3 to move downwardly. The float ball carried by arm 3 is thus pushed down into the water below the floating position of the float ball by the additional force exerted against the lower surface or wall of the piston, transmitted through member 13 to the valve seat portion, to the annular area of the washer 12 abutted by the seat, and thence through valve member 8 to the central pivot portion of the lever arm 6.

The valve seat member 13 as shown in Figs. 2 and 3 may be constructed and arranged in various ways. The modified construction of Fig. 4, for example, comprises a pressure responsive chamber in the form of a sylphon or bellows 26 in place of the piston arrangement of Figs. 2 and 3. Inlet pipe or conduit 27 of Fig. 4 is arranged as before to provide water through a pipe 28 of reduced diameter, which functions as a nozzle to draw water through the restricted passage between the outer wall of pipe 28 and the wall of the central cylindrical bore of valve seat member 29. Bellows 26 is sealed at its lower end to a member 30 forming the lower portion of a housing in which the bellows is disposed. Member 30 is provided with a tapped opening into which pipe 27 is threaded and into the other end of which nozzle 28 is inserted and secured by brazing or soldering, as shown, or by a threaded connection if desired. Cup like member 31 is arranged to form the side walls of the housing for the bellows, and the bottom of member 31 is provided with a threaded opening to receive the external peripheral threads of member 30.

The upper end of bellows 26 is connected to valve seat member 29 at the under side of a flange portion 32 extending peripherally outwardly from the valve seat member. The bellows 26, accordingly, comprises a chamber sealed to the inlet collar 29 within which the inlet conduit pressure is exerted against the underside of the movable flange member 32, which comprises the movable wall of the expansible chamber, and the member 32 is mechanically connected to the member 29, being, in the specific construction shown, fabricated from the same piece of material. The upper portion 33 of member 29 comprises a valve seat member or portion and this may be a separate member from the remainder of member 29 but mechanically connected thereto, or for greater convenience in manufacture, it may be as in the particular construction shown fashioned from the same piece of material.

Flange member 32 and valve seat member 33 are biased downwardly by either the weight thereof, or by a tendency of the bellows to collapse from the natural resilience, or both, and when the valve is open, valve seat 33 moves downwardly away from the valve member. The valve member, which is not shown, may be arranged as in Figs. 1, 2 and 3, and it will be understood that a complete valve body, float and linkage mechanism, fill outlet or pipe, and preferably an after flow pipe should be provided all in accord with the earlier described embodiment.

While each of the disclosed embodiments incorporates a pressure responsive chamber coaxial with the inlet conduit, valve member and valve seat, there may be alternatively provided an external expansible chamber, such as a cylinder and piston or a bellows, in communication with the inlet together with a mechanical linkage connecting the movable wall of the chamber to the valve seat member in response to pressure changes in the inlet conduit. A system of this type is shown in Fig. 5.

As shown in Fig. 5, the valve comprises a valve body 34 and a movable valve member 35. A lever arm 36 is arranged to move member 35 toward and away from the seated position shown in Fig. 5 to close and open the valve in accord with the position of float ball 37. Lowering of the water level, indicated by broken line 38, will cause ball 37 to drop, rotating float arm 39 in a clockwise direction about stationary pivot pin 40, suitably supported from the valve body 34. This motion of arm 39, in turn, causes an upward pull on connecting link 41 to apply an upward force to lever arm 36 through a pivot pin 42, which connects the link to the arm. This force rotates arm 36 clockwise about pivot pin 43 to raise valve member 35 away from valve seat 44 and open the valve admitting a flow of water from inlet pipe 45 into body 34 from which the water flows through a pipe 46 into the tank 47.

Pivot pin 43, which supports one end of arm 36, is mounted to a pair of straps or rods 48, one of which is shown partially broken away in Fig. 5, and motion or force to assist in closing, as well as in opening, the valve is imparted to arm 36 through these straps and pin 43 to the area of the arm 36 in contact with the pin.

A flow restricting member 49 having an orifice smaller than the inside diameter of pipe 45 is arranged in the pipe 45, conveniently at the region of attachment of pipe 45 to the water supply pipe at the bottom of the tank 47. An expansible chamber, shown as a sylphon or bellows 50, but which may be a cylinder and piston arrangement for example, is arranged in communication with inlet pipe 45 through a branch conduit 51, which also serves to support bellows 50. The lower end of the bellows, as shown in the drawing, seats within a central declivity in the upper face of a platform 52 attached to the strap members 48, the platform being conveniently formed of a single piece of metal with the straps. Below platform 52 is a compression spring 53, supported on a shelf 54 protruding outwardly from pipe 45. Spring 53 tends to compress bellows 50 and to raise platform 52 and straps 48, this action being opposed by the water pressure within pipe 45 and bellows 50. The lower wall of the bellows in contact with platform 52 is the movable wall of the bellows.

A guide member 55 for straps 48 is arranged to extend from valve body 34 and preferably to encircle the straps 48 preventing excessive motion of the straps in a transverse direction. A stop pin 56 extends through the straps in a position to abut guide member 55 if the bellows tends to expand further than desired, or if the valve tends to close with the float ball appreciably below the desired full tank water level. The stop pin is not, however, necessary to the proper operation of the valve.

In operation, if the water is permitted to drain from tank 47, the float ball 37 falls, applying an upward force at pivot pin 42 to lever arm 36 which causes the arm to rotate about pin 43 to raise valve member 35 pivotally connected near the center of arm 36. This movement opens the valve and results in a substantial pressure drop in pipe 45, which, in turn, permits bellows 50 partially to collapse under the force of spring 53 to move upwardly straps 48 and pivot pin 43. The valve member 35 is thus further displaced from seat 44 and water flows freely into the tank through pipe 46, the rate of flow being limited by the throttling effect of the orifice in member 49.

As the tank fills and ball 37 rises, the opening between seat 44 and valve member 35 becomes more and more restricted until the flow is throttled at this point to an appreciable extent. As this occurs, the pressure in pipe 45 again increases toward the pressure at the inlet side of orifice member 49, and when the pressure in pipe 45 becomes sufficiently great, bellows 50 is again expanded to compress spring 53, to move pin 43 and the area of arm 36 in contact with the pin in a downward direction whereby arm 36 is rotated about pin 42 further to close the valve. The effect is cumulative and the valve member 35 is quickly and firmly seated against seat 44. Immediately following the valve closing, the arm 36 is further rotated about the pivot point at the valve member, by further expansion of bellows 50, to provide an upward force through link 41 to rotate arm 39 about pivot pin 40 in the direction to cause ball 37 to be forced into the water below the position which would be required to close the valve in the absence of bellows 50. The force exerted between valve member 35 and valve seat 44 is increased by the additional buoyant force from ball 37, and because the operation occurs very rapidly after the first slight expansion of bellows 50, the flow of water into the tank is changed from substantially a full rate of flow to shut off in what may be only a fraction of a second.

It may be found desirable, to prevent water hammer effects, to make the passageway in conduit 51 very small, or to arrange a dashpot in parallel with spring 53, to cause bellows 50 to expand slowly, or certain other known methods of reducing water hammer may be employed.

In the valve in accord with Fig. 5, as is the case in the valves of Figs. 2 and 4, partial closing of the valve as the tank becomes full operates to expand an expansible chamber, and the resultant motion of the movable chamber wall applied to the lever arm is in a direction to drive the float ball into the water in the tank. The force then applied by the ball through the connecting linkage to the movable valve member tending to maintain the member seated in valve closing position is substantially greater than it would be had not the motion of the chamber wall been applied to increase the depth to which the ball is submerged in the water.

It will be apparent that operation in accord with the invention may be provided by means to impart mechanical motion to the valve seat in response to pressure changes on the outlet side of the valve, as for example, in chamber 16 of Fig. 2. By restricting the flow of water from the chamber 16 into the pipes 9 and 10, the pressure in the chamber 16 will increase as the valve is opened. This increased pressure may be applied to force the valve seat away from the valve member, as for example, against a spring biasing force. Then as the valve starts to close, the pressure in chamber 16 will tend to decrease permitting the spring bias to force the valve seat toward the valve member.

While I have shown only certain preferred embodiments of my invention by way of illustration, many modifications will occur to those skilled in the art and I therefore wish to have it understood that I intend, in the appended claims, to cover all such modifications as fall within the true spirit and scope of my invention.

What I claim as new and desire to secure by Letters Patent of the United States is:

1. A valve mechanism comprising a movable valve member, a lever arm connected to said member at a predetermined portion of said arm, a member arranged to apply a valve actuating force to a second separate portion of said arm in a predetermined direction to tend to close said valve and to provide increased force upon motion of said second portion in the opposite direction, valve seat means for cooperation with said valve member arranged to abut an area of said member when said valve is closed, supporting means for pivotally supporting said arm and in contact with a predetermined area of said arm spaced from each of said portions, and apparatus to move said second portion in said opposite direction in response to a predetermined partial closing of said valve, said apparatus comprising an expansible chamber in communication with an inlet conduit for said valve and having a wall arranged to move in response to increase in pressure in said conduit, and means to complete a connection to apply said motion of said wall to one of said areas in the direction to move said second portion in said opposite direction, said last means comprising said supporting means.

2. A ball cock valve mechanism comprising a valve seat in communication with an inlet conduit closed by a movable valve member, a lever member actuated by a float ball to have an end depressed in response to a rise of said ball to move said valve member toward said seat, and an expansible chamber responsive to an increase in pressure in said conduit to apply a force to said lever to move said ball downwardly and to increase the pressure between said seat and said valve member.

3. In a valve mechanism of the type comprising a movable valve member and a valve seat closed by said member, an arm, movable actuating means arranged to apply a moving force to said arm at a first predetermined portion thereof, two spaced apart pivot points for said arm spaced from said portion, the one of said pivot points closest said portion having said valve member pivoted thereon, whereby movement of said portion in a first direction rotates said arm about the other said pivot and moves said valve member in said first direction, and a pressure responsive expansible chamber having a movable wall arranged through one of said pivot points to transmit a force in response to increased pressure in said chamber to increase the force couple exerted on said arm at said points in opposition to said moving force thereby to increase the force between said valve member and said seat and increase the forces opposing said moving force.

4. In a ball cock valve mechanism for a fluid conduit comprising a valve member movable in response to the motion of a float, a movable valve seat member for cooperation with said valve member, and means to increase the force between said valve member and said cooperating valve seat member, said means comprising means responsive to pressure in said conduit for forcing said seat member against said valve member in response to an increase in pressure in said conduit.

5. A fast-acting valve mechanism comprising a movable valve member, a movable valve seat member, means for separating said members to initiate opening of said valve and to move one of said members toward the other to initiate closing of said valve, a conduit connected to said valve to supply a fluid under pressure thereto, a chamber having an element movable in response to the pressure in said chamber, said conduit and said chamber being in communication to provide movement of said element in one direction in response to an increase in pressure in said conduit and in the opposite direction in response to a reduction in pressure in said conduit, and means to transfer said motion of said element to said other member, said last means being oriented to move said other member toward said one member in response to an increase in pressure in said conduit and chamber, thereby to assist in closing said valve.

6. A liquid valve mechanism comprising a movable valve member, a movable valve seat member, an inlet adapted to be connected to a source of liquid under pressure to be controlled by relative movement of said members, said inlet terminating at said valve seat to supply said liquid through the opening of said seat, a liquid-confining chamber in communication with said inlet comprising a movable element sealed in said chamber biased in a predetermined direction and movable in response to the pressure of said liquid in the opposite direction against said bias, said element being connected to said seat member to move said seat member toward said valve member in response to an increase in pressure in said chamber against said element sufficient to overcome said bias.

7. A valve mechanism comprising a valve member and a cooperating valve seat member, means to move one of said members away from the other said member to initiate opening of said valve and to move said one member toward said other member to initiate closing of said valve, said valve having an inlet and an outlet, fluid pressure responsive means in communication with a predetermined portion of said valve and comprising in part a movable physical element, said last means being responsive to the pressure of fluid in said predetermined portion to move said physical element thereof in a predetermined direction in response to an increase in said pressure, said element being biased in the opposite direction and being physically connected to said other member to move said other member toward said one member in response to motion of said element in said predetermined direction and away from said one member in response to motion in said biased direction, said bias being of sufficient force to move said element in said opposite direction when said pressure is appreciably changed in response to a partial opening of said valve.

8. A valve mechanism for controlling liquid flow in a conduit, said valve comprising a valve member and a valve seat member, each of said members being movable in a valve closing direction toward each other and in an opposite direction away from each other, said valve being adapted to affect the pressure existing in said conduit in a predetermined sense in response to closing of said valve and in the opposite sense in response to opening of said valve, pressure responsive means forming a chamber communicating with said conduit and comprising means movable in one direction in response to a pressure change in said one sense in said chamber, said last means being connected to move one of said members in the valve closing direction of motion thereof in response to motion of said last means in said one direction of motion thereof, and means to move the other of said members in the valve closing direction of motion thereof to initiate said pressure change in said one sense.

9. In a fluid control valve mechanism, a valve member, a valve seat member, each of said members being movable toward and away from each other, valve actuating means comprising means to apply an external force to move one of said members selectively in said directions, a conduit communicating with said valve seat member adapted to supply thereto under pressure the fluid to be controlled, and means responsive to an increase in pressure in said conduit to move the other of said members in the direction toward said one member, said means comprising walls defining a substantially fluid-tight chamber communicating with said conduit of which a wall is arranged for motion in response to an increase in pressure in said chamber, said wall being mechanically connected to said other member to move said other member in the direction toward said one member in response to said increased fluid pressure.

10. In a fluid control valve mechanism, a valve member, a valve seat member, each of said members being movable toward and away from each other, valve actuating means comprising means to apply an external force to move one of said members selectively in said directions, a conduit communicating with said valve seat member adapted to supply thereto under pressure the fluid to be controlled, a cylinder and piston slidable within said cylinder, means communicating between said conduit and cylinder to equalize the pressure therebetween, said piston being biased in one direction and slidably moved in an opposite direction in response to an increase in pressure in said cylinder, and a mechanical connection between said piston and seat member to move said seat member in the direction toward said valve member in response to an increase in pressure in said conduit and cylinder.

11. In a ball cock valve mechanism comprising a fluid inlet conduit, a valve seat member, a float, and a valve member to cooperate with said seat; means coupling said float to one of said members to move said one member to operate said valve, and means responsive to a change in pressure in a predetermined part of said valve to increase the moving force exerted by said float on said one member, said last means comprising means operative to decrease the distance between and force together said members, and operative through said first means to force said float downward.

12. A valve mechanism comprising a movable valve member, a lever arm connected to said member at a predetermined portion of said arm, a member arranged to apply a valve actuating force to a second separate portion of said arm in a predetermined direction to tend to close said valve and to provide increased force upon motion of said second portion in the opposite direction, valve seat means for cooperation with said valve member arranged to abut an area of said member when said valve is closed, supporting means for pivotally supporting said arm and in contact with a predetermined area of said arm spaced from each of said portions, and apparatus to move said second portion in said opposite direction in response to a predetermined partial closing of said valve comprising an expansible chamber in communication with an inlet conduit for said valve, said chamber having a wall arranged to move in response to increase in pressure in said conduit, and connecting means to apply said motion of said wall through said supporting means to said predetermined area of said arm in the direction to move said second portion of said arm in said opposite direction.

13. A valve mechanism comprising a movable valve member, a lever arm connected to said member at a predetermined portion of said arm, a member arranged to apply a valve actuating force to a second separate portion of said arm in a predetermined direction to tend to close said valve and to provide increased force upon motion of said second portion in the opposite direction, valve seat means for cooperation with said valve member arranged to abut an area of said valve member when said valve is closed, a supporting member for said arm pivotally attached to a predetermined area thereof remote from each of said portions, an expansible chamber in communication with and responsive to liquid pressure in a predetermined portion of said valve, said chamber having a wall movable in accord with said liquid pressure, and coupling means for transferring said motion of said wall to said predetermined area of said arm, said portions and area of said arm being relatively so positioned that motion of said wall which tends to close said valve will also tend to force said second portion in said opposite direction.

14. A valve mechanism comprising a movable valve member, a lever arm connected to said member at a predetermined point of said arm, an actuating member connected to apply a valve actuating force to a second separate point of said arm in a predetermined direction to tend to move said arm in a direction to close said valve and to provide increased force when said second point is forced to move in the opposite direction, valve seat means for cooperation with said valve member arranged to contact a portion of said valve member when said valve is closed, supporting means for pivotally supporting said arm and in contact with a predetermined portion of said arm spaced from each of said points, and means to move said second point in said opposite direction in response to a predetermined closing of said valve, said means comprising an expansible chamber in communication with an inlet conduit for said valve and having a wall arranged to move in a predetermined direction of motion in response to increase in pressure in said conduit, and means to complete at least a temporary one way connection effective upon said wall motion in said predetermined direction of motion to apply said wall motion in said predetermined direction of motion to one of said portions in the direction to move said second point of said arm in said opposite direction, said last means comprising the one of said two first mentioned means which is arranged to contact said one portion.

15. A float operated valve mechanism comprising a fluid inlet conduit, a lever, a float connected to move a predetermined portion of said lever in a predetermined valve closing direction in response to a rising float level, two spaced points on said lever remote from said portion, means pivotally connecting to said lever at one of said points, a valve member connected to the other said point of said lever, valve seat means engageable with said valve member to control the flow of fluid in said conduit, chamber means communicating with said conduit and comprising pressure responsive means connected to one of said two first mentioned means and oriented to apply a force in response to increased pressure in said chamber to said one means to pivot said lever in a direction to move said portion in a direction opposite to said predetermined direction.

References Cited in the file of this patent

UNITED STATES PATENTS

| Number | Name | Date |
| --- | --- | --- |
| 453,997 | Folger et al. | June 9, 1891 |
| 649,635 | Ford | May 15, 1900 |
| 688,166 | Gaylord | Dec. 3, 1901 |
| 1,038,527 | Coleman | Sept. 17, 1912 |
| 1,217,183 | Jackson | Feb. 27, 1917 |
| 1,248,650 | Gustafson | Dec. 4, 1917 |
| 1,333,646 | Watrous | Mar. 16, 1920 |
| 1,426,093 | Owens | Aug. 15, 1922 |
| 1,483,392 | Spearing | Feb. 12, 1924 |
| 1,747,910 | Siefarth | Feb. 18, 1930 |
| 1,794,640 | Owens | Mar. 3, 1931 |
| 1,800,463 | Meinken | Apr. 14, 1931 |
| 1,885,424 | Fischer | Nov. 1, 1932 |
| 1,903,816 | Hanson | Apr. 18, 1933 |
| 2,352,047 | Wahl | June 20, 1944 |
| 2,366,520 | Griffith | Jan. 2, 1945 |
| 2,421,810 | Simpson | Jan. 10, 1947 |
| 2,610,648 | Meyer | Sept. 16, 1952 |

FOREIGN PATENTS

| Number | Country | Date |
| --- | --- | --- |
| 1,729 | Great Britain | of 1875 |
| 52,944 | Switzerland | of 1910 |
| 248,474 | Switzerland | Sept. 17, 1912 |
| 903,013 | France | Jan. 5, 1945 |